Patented Jan. 7, 1941

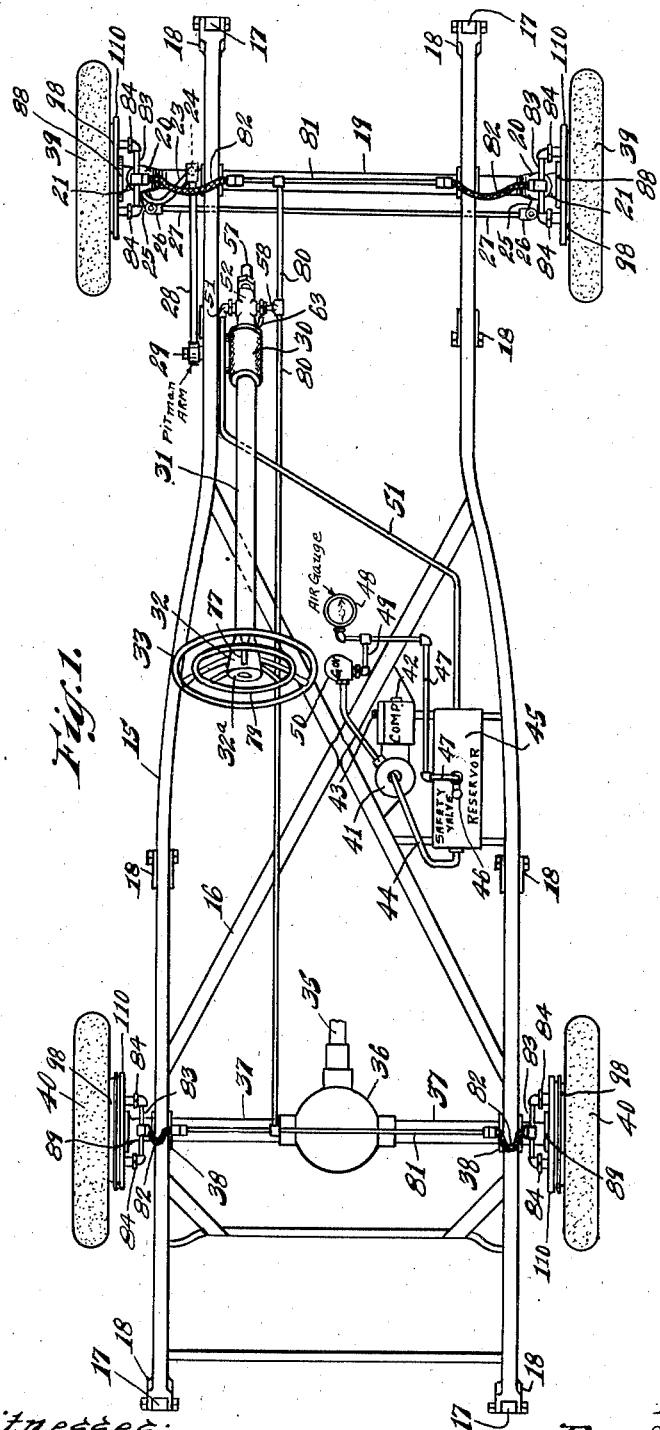

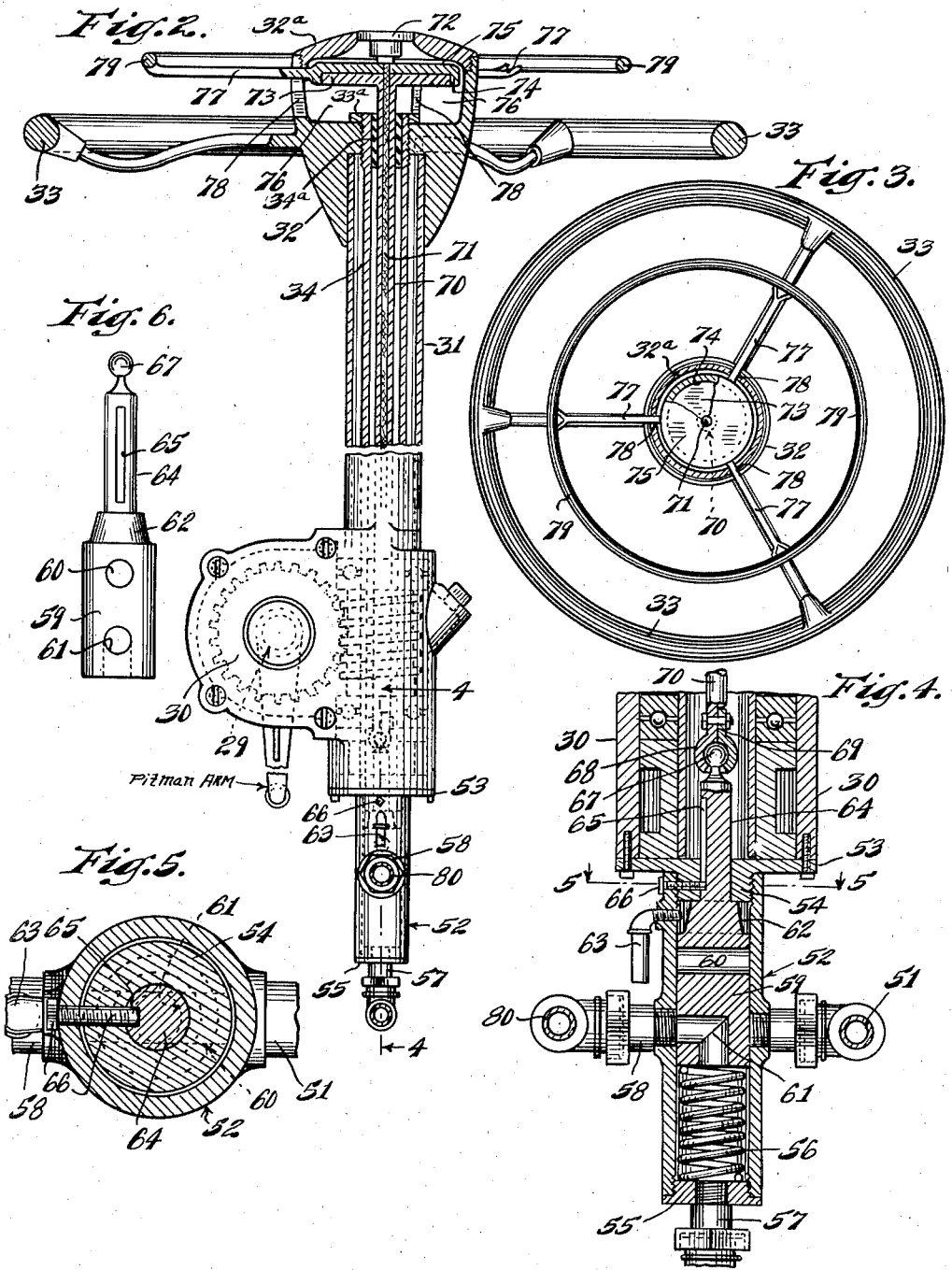

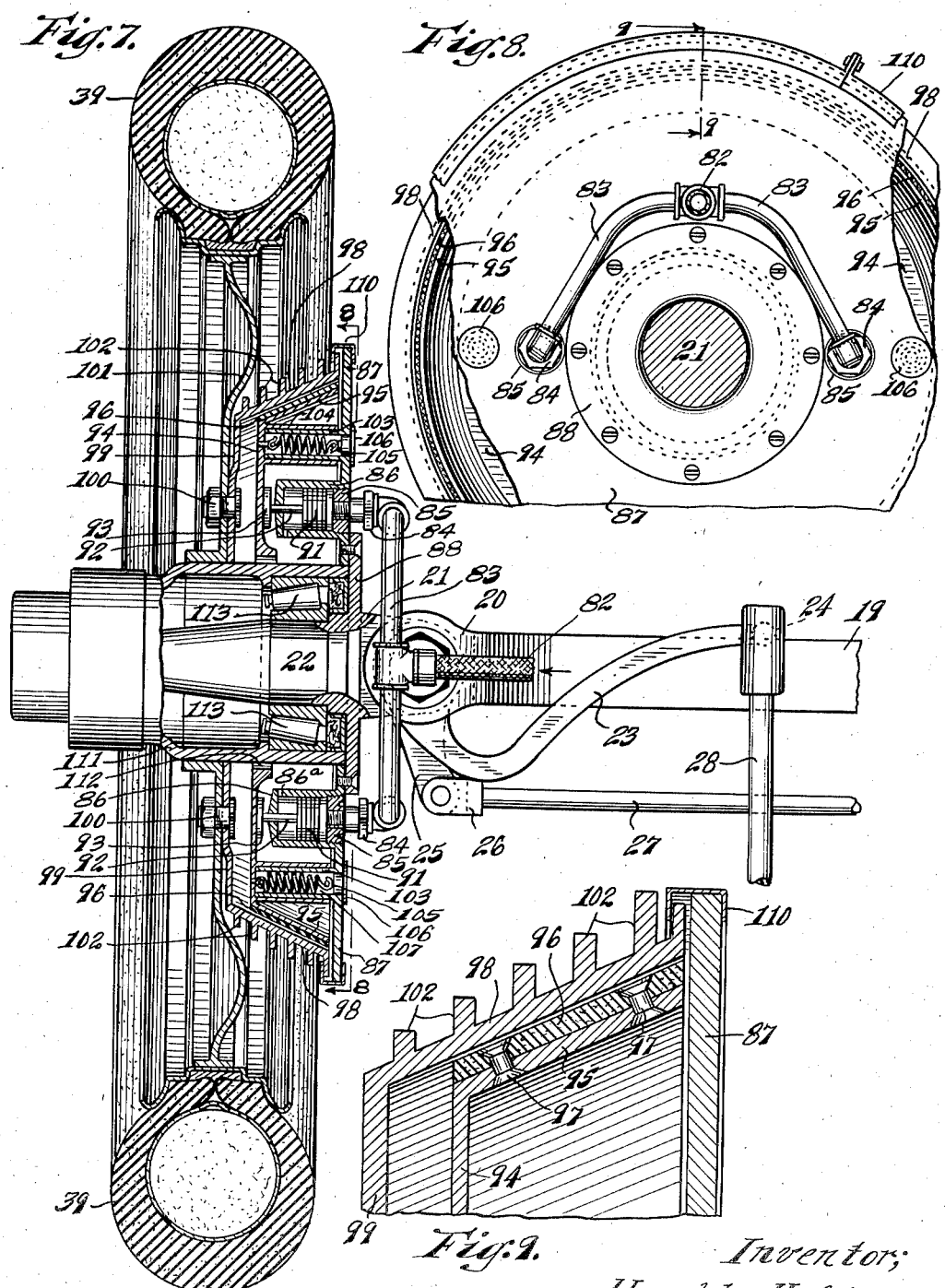

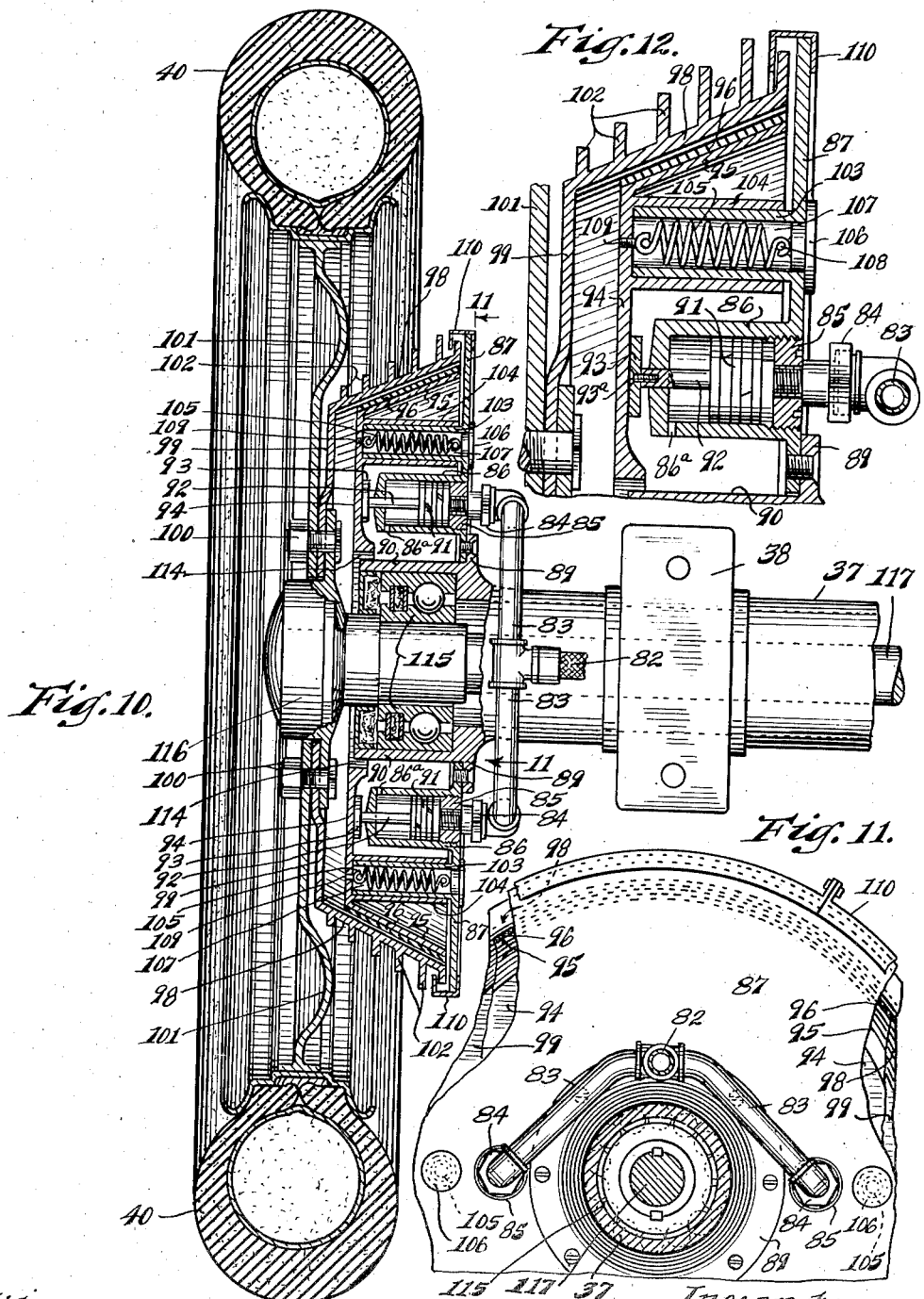
Jan. 7, 1941. H. HOLK 2,227,584
FLUID PRESSURE BRAKE
Filed Feb. 13, 1939 4 Sheets-Sheet 4
Inventor:
Harold Holk,
By Joshua R H Potts
his Attorney.

2,227,584

UNITED STATES PATENT OFFICE 2,227,584

FLUID PRESSURE BRAKE

Harold Holk, Chicago, Ill.

Application February 13, 1939, Serial No. 256,065

9 Claims. (Cl. 188—152)

This invention relates to fluid pressure brakes for vehicles and particularly automobiles, adapted especially to be operated by air pressure under delicate control absolutely by the operator or driver of a car and is what I term a finger touch air brake.

The invention embodies novel brake structure applied to the wheels and embodying conical or interfitting tapered circular drums and shoes coacting therewith and adapted to be forced by air pressure into braking position, but automatically released or retracted to an inoperative position upon release of the control means.

The invention not only consists in a novel assembly and structure of air brake system, particularly with respect to its application to all four wheels of an automobile, but also in a novel control means and valve therefor mounted in the steering column axially and capable of convenient and minute control by means of a ring mounted on the steering column or post in convenient position for operation by the fingers to any position around the wheel and without in the least interfering with the driving operations.

Other objects and advantages will appear and be brought out more fully hereinafter, reference being had to the accompanying drawings, wherein:

Fig. 1 is a plan view of an auto chassis equipped with the air brake system;

Fig. 2 is an enlarged sectional elevation of the steering post or column with operative connections to brakes;

Fig. 3 is a plan view of the steering wheel and column, partly in section;

Fig. 4 is an enlarged vertical section showing the operative connections with the control valve taken on the line 4—4 of Fig. 2;

Fig. 5 is a section on line 5—5 of Fig. 4;

Fig. 6 is an elevation of the valve plunger or head;

Fig. 7 is a horizontal diametrical section through a front wheel and brake;

Fig. 8 is an elevation partly in section taken on the line 8—8 of Fig. 7;

Fig. 9 is an enlarged fragmentary sectional view of a brake drum and cone with its anchoring base or plate taken on the line 9—9 of Fig. 8;

Fig. 10 is a view similar to Fig. 7 of a rear wheel and brake;

Fig. 11 is an elevation partly in section similar to Fig. 8, taken on the line 11—11 of Fig. 10; and Fig. 12 is an enlarged horizontal radial section of one side of the brake shown at the top of Figs. 7 and 10.

Referring more particularly to the drawings, 15 indicates the chassis frame of the usual or any preferred construction, shown having the usual side bars or sills suitably connected and reinforced as by an X- or cross brace 16 and provided with the usual front and rear springs 17 of any suitable type, shown connected to the frame by shackles 18. The front axle is designated at 19 and has the usual yokes or forks 20 or other suitable provision for pivotally supporting the steering knuckles 21 as shown in Fig. 7, carrying the front axle spindles 22 for steering the car or other vehicle. One steering knuckle is connected to a steering arm 23 shown extending over the axle and provided with a steering ball in the form of a universal or ball and socket joint 24. Steering arms 25 are also connected to each knuckle or spindle and are provided with pivotal connections or yokes 26 which are in turn connected by a tie rod 27 so that the two spindles will turn in unison when operated by means of a link 28 provided with a socket at the joint 24 and in turn hooked to the usual pitman arm of the steering gear having connection with the shaft 29 of the steering gear 30, usually of the worm gear type as indicated in dotted lines in Fig. 2 and suitably bolted to a side member of the frame. The steering gear column or post in the form of a hollow tubular member is designated at 31 and rotatably supports the hub 32 of the steering wheel 33, the hub 32 having a removable top portion or threaded cap member 32a closing a large cavity in the top of the hub 32 through which certain operating parts are inserted and having a bottom bore or cavity receiving the column so that the wheel may turn thereon. The steering wheel hub is fixed to a tubular shaft 34 which is in turn fixed to the steering gear 30. 35 is the usual drive shaft as shown in Fig. 1 which may have the customary universal joints adjacent the motor and adjacent the rear differential housing 36 constituting a part of the rear axle housing 37 which extend to opposite sides and are gripped or clipped by U-bolts, spring plates or brackets 38 to the springs 17. The front wheels are designated at 39 and the rear wheels at 40.

A compressor 41 of any suitable type is mounted upon the chassis and is illustrated as of a type commonly used on some automobiles and having a shaft 42 operated in any suitable way and provided with a sliding gear 43 which may be driven in any suitable way by a separate motor, by a counter shaft on the motor (not shown) or by having the sliding gear in mesh with the reverse idler gear of the transmission, the sliding gear being thrown in when needed and out when not needed, as by means of a lever. In such case, the engine is stopped to operate the compressor and when the transmission gears are idle, the slide gear of the compressor is shifted in mesh with the reverse idler gear and the engine started, being sure that the gear shift lever is in a neutral position. Of course, the compressor may be otherwise suitably operated and is bolted to the frame or transmission case. A main discharge line or pipe 44 leads from the compressor and is connected to a reservoir or pressure tank 45 which usually carries between 85 and 90 pounds per square inch braking pressure. This reservoir has a release or safety valve 46 to discharge excess pressure and is shown connected at the same point with a gauge line 47 connected to an air gauge 48 preferably positioned on the dash or other convenient place discernible to the driver. A return or branch line 59 with an interposed governor 50 is also connected to the compressor for the return of the circuit. A pressure supply line 51 leads from the reservoir and is connected to a control valve 52 shown in the form of a cylinder with the upper end internally threaded to connect with the bottom plate 53 of the steering gear assembly housing 30 through the medium of an externally threaded depending flange 54, although any other suitable form of air tight connection may be employed with suitable interposed packing if found desirable or necessary. This connection may be considered in the form of a flanged collar, the part 54 being the collar and the part 53 a flange on the collar bolted as shown in Fig. 4 or otherwise suitably connected to the bottom end of the housing of the steering or worm gear assembly 30 with suitable interposed packing, if desired. A plug 55 is threaded or otherwise connected to the lower end of the cylinder and is in the form of a flanged collar and provided with a small central bore around which an expansible spring 56 is supported, the lower end of the spring bearing on the plug and an exhaust connection 57 being connected to the plug leading to the atmosphere for exhausting the brake line, as will be later described. In addition to the inlet of the pressure line 51 at one side of the cylinder, an outlet 58 is provided at the diametrically opposite side for cooperation with a plunger 59 in the form of a cylindrical piston operating in the cylinder and having a diametrical passage 60 near its upper end and an L-shaped passage 61 near its lower end and adapted to register at times with the outlet 58, while the lower end extends into the chamber or housing of the spring 56. The top of the plunger has a reduced or conical portion 62 forming an annular chamber around it provided with an exhaust 63 to prevent the formation of a dash pot above the plunger within the cylinder and beneath the flange 54 with which the top of the conical portion 62 engages by the shoulder thus formed to limit the upward stroke of the plunger. The shoulder is formed by a reduced stem 64 on the plunger extending upwardly and splined to the collar or flange 54 as by means of a slot 65 longitudinally of the stem periphery and engaged by a key, screw or pin 66 to prevent the plunger from turning, but still permit free axial movement or reciprocation thereof so that the passage 60 may be simultaneously registered with the inlet 51 and the outlet 58 at the downward position or limit of the plunger valve or piston 59 and the passage 61 moved into and out of registration with the outlet 58 at times, depending upon the position of the plunger, but particularly when the latter is in its normal or upward position under the action of the spring 56.

Means is provided for connecting the upper end of the stem and thus the plunger with a suitable operating means having connection therewith and mounted on the steering column and wheel of the automobile or other vehicle and shown in the form of a ball and socket swivel joint or other separable connection or universal joint having a ball 67 on a reduced portion at the upper end of the stem received in a socket 68 shown having a split connection 69 to facilitate assembly, although any other suitable form of connection may be employed with the lower end of a hollow valve rod 70 positioned in the center of the steering column or post 31 and adapted to take the wiring 71 leading to the usual warning signal or horn operated from a button switch 72 at the top of the hub of the steering wheel. The tubular rod 70 is also positioned within the tubular shaft 34 fixed to one of the gears of the steering or worm gear assembly 30 and rigidly connected to the hub 32 by means of an interposed web or plate formed above the bottom cavity of the hub which receives the post 31 on which it turns. A threaded connection is illustrated in Fig. 2 with a clamping nut 33a at the top of the tubular shaft 34 and an interposed bronze bushing 34a bearing rod 70.

A disc 73 fits loosely in a socket 74 to swivel or turn in the bottom of a flanged plate 75, which parts together with the upper end of the tubular shaft 34 and the clamping nut are accommodated within an enlarged cavity 76 in the top of the hub provided with a central opening for the switch button or plate 72 of the horn. The flanged plate or disc 75 may be considered as having a peripheral depending flange receiving or fitting over the disc 73 and is provided with a plurality of lateral radial arms or spokes 77, preferably three in number equidistantly spaced above the spokes of the steering wheel 33 and operating in vertical slots 78 in the hub 32 communicating with the cavity 76. A ring or rim 79 in conjunction with the arms 77 form an operating wheel adapted to be depressed while gripping the steering wheel by pressing the same with a finger at either side with a minimum of pressure which may be regulated according to the braking pressure which may be required to stop or check the momentum of the vehicle depending upon its speed or velocity and is conveniently smaller than the steering wheel.

A distributing line or pipe 80 is connected to the outlet 58 of the control valve 52 and connects at its ends with cross pipes 81 adjacent or over the front and rear axles and shown connected at their ends by hose 82 with yokes or forked pipes 83 at each wheel. The connections are made by means of couplings 84 on the ends of the pipes 83 extending diametrically of the wheels at the inside, with a plurality of plugs 85 correspondingly related and having threaded bores for this purpose. Cylinders 86 are provided in similarly related positions at the bores or openings which receive the plugs and formed with or attached to flat plates or discs 87 constituting brake shoe bases or anchoring plates for the brakes proper at the wheels. Each cylinder is provided with a bleed duct 86a adjacent its outer closed end but in its lateral wall, to prevent the formation of a dash pot on the outward strokes of the pistons 91 adapted to reciprocate therein. The knuckles 21 are provided with flanges 88 and the ends of the rear axle housing 37 are provided with flanges 89 adapted to be secured by stud bolts or otherwise to the plates 87 and the ends of the housing 37 are provided with cylindrical extensions 90 forming bearing sleeves. The pistons 91 which operate in the cylinders for pressure operating the brakes by the air under pressure stored in the reservoir have stems 92 operating in central bores in the heads of the cylinders and provided with enlarged detachable swiveled contact heads or presser feet 93 which engage brake discs 94 which may be said to be in the form of circular shoes with enlarged apertures at their centers preferably thickened at their wall portions for clearance over the bearing portions of the wheels constituted by the hubs thereof, as shown more particularly in Figs. 7 and 10. Each brake shoe or disc is provided with a conical shoe portion 95 shown in the form of frusto-conical or tapering and flared flanges which carry brake linings 96 on the outside in the form of circular bands which may be attached in any suitable way as by means of rivets 97. The brake drums are shown in the form of discs having conical portions 98 in the form of frusto-conical, flared or tapered flanges peripherally at the corresponding edges of the drums 99 or disc portions thereof but which are deeper than the brake shoes so as to allow movement of the latter axially in the application and release of the brakes. The drums are bolted to the hubs or discs at 100 of the disc wheels 101. The flanges of the brake drums which, like the shoes, are larger at their inner edges or open sides, are provided with a plurality of radial parallel or otherwise related peripheral flanges or fins 102 to dissipate the heat of compression due to the heat of resistance in the braking action under the force of the air pressure and thus increase the useful life of the brakes and particularly the drums thereof. The discs 87 are provided with tubular cylindrical extensions 103 and the brake shoes or discs 94 are provided with corresponding extensions or cylinders 104 extending in opposite directions and telescoping one within the other. These form housings for retractile springs 105, one end of each of which is connected to a flanged plug 106 fitted in an opening 107 forming the bore of each inner extension 103 of the plates 87. The inner end of each spring is connected as at 108 by means of a hook or otherwise to a plug, the flange of which engages the inner face of a plate 87 to prevent displacement and the outer end of each spring is connected as at 109 by a similar hook and eye connection, the eye of which may have a threaded shank threaded in an opening in each brake shoe 94, so as to retract the brake shoes and hold them in the normally disengaged position spaced from the drums except when pressure is admitted to the cylinders 86 against the pistons 91 to apply the brakes under control at the brake ring or operating member on the steering wheel through the control valve 52. A split ring 110 shown in the form of a channel is fitted on the peripheral edges of the discs 87 and flanges at the inner ends of the conical portions 98 of the drums 99, the same being detachably clamped in position and serving to exclude dust and moisture from between the parts of the brakes. The hubs 111 of the front wheels operate loosely in the openings in the brake discs 94, sufficient clearance being provided at 112 so that there will be no contact or retardation. Suitable bearings 113 are provided between the hubs 111 and spindles 22. A similar clearance 114 is provided in connection with the rear wheels at corresponding locations and ball or other anti-friction bearings 115 are provided between the rear axles and the housings and axletrees or hubs 116 with suitable interposed packings to prevent the escape of lubricating grease of the axles 117 and differential, the axles 117 being connected in the usual way to the drive shaft 35 through the medium of the differential gears 36.

Attention is directed to the fact that while the cylinders 86 are shown integral with the plates or discs 87, they may be otherwise suitably mounted and the contact head or presser foot 93 in each instance, is preferably separate from the stem and secured by a swivel pin or stud bolt 93a and in such a way as to allow side play angularly between the presser foot and the stem so that the presser foot will properly fit against the brake disc or brake shoe support 94. Provision may also be made for adjusting the tension of the springs 105 as by means of the plugs or caps 106. Normally, the brakes are released and this is due to the automatic action of the control valve which places the L-passage thereof in communication with the air lines from the valve to the various wheels while cutting off the supply of air and connecting said lines to an exhaust outlet which may be led to any convenient position beneath the car. The particular type of air valve and controlling means in the form of a depressible ring adjacent the steering wheel capable of delicate control for causing sudden or very gradual braking operation upon depression of the ring to operate the control valve for admitting air from the compressed air reservoir through the valve and by air lines to the brakes in order to cause the movable brake shoes to engage the drums and bring about a braking action, is particularly desirable and advantageous. The valve is so constructed that the amount of air admitted to the brakes may be regulated to a nicety by the degree of pressure upon the operating ring and rod controlling the valve.

In the operation of the device, the compressor is operated as described to maintain the car brake operating pressure in the reservoir which is governed and released of any excess pressure. The pipe line 51 carries this pressure to the control valve which normally cuts off the air or fluid pressure from the brakes. Thus, by depressing the operating ring on the steering wheel and the rod connecting the same to the valve plunger, the latter may be depressed any desired degree so that the diametrical passage will be aligned with the pipes 51 and 58 to admit air to the pipes 80 and 81. When this is done, the air is admitted into the cylinders 86 in front of the pistons 91 to cause the heads 93 to engage and force the supporting plates or bases 94 of the brake shoes against the action of the tension springs 105 which normally retract the shoes into a released position, and thus cause the shoes through the intermediary of the brake linings thereon to engage the brake drums at the conical portions 98. Immediately upon release of the pressure on the ring under touch control of the operator or driver, the springs 56 will return the plungers to a normal position wherein the passage 60 will be raised out of alignment with the pipes constituting the inlet 51 and outlet 58. The action of the spring 56 may be regulated by adjustment of the plug 55 and when the plunger is so raised, the angular or L-shaped passage 61 by registering with the outlet 58 leading to the pipe lines and brake shoes or cylinders thereof, will be placed in communication with the exhaust 57, thus permitting the air to be exhausted from the cylinders in front of the pistons and the pipe lines by the action of the springs 105 in returning the brake shoes and associated parts to normal disengaged positions. The tubes 103 and 104 form brake shoe guides. Attention is also directed to the fact that the slot 65 and the key or screw 66 constituting the splined connection between the plunger 59 and its cylinder, serves to limit the throw or degree of movement of the plunger in addition to preventing rotational movement thereof, insuring registration of the passages or ports of the plunger with the inlet, outlet and exhaust, respectively.

While I have illustrated and described the preferred form of construction for carrying my invention into effect, this is capable of variation and modification without departing from the spirit of the invention. I, therefore, do not wish to be limited to the precise details of construction set forth, but desire to avail myself of such variations and modifications as come within the scope of the appended claims.

Having thus described my invention, what I claim as new and desire to secure by Letters Patent, is:

1. In a fluid pressure brake, a brake drum, a base member, a shoe carried by the base member and cooperating with the drum, telescoping tubular extensions between the shoe and base member to normally retract the shoe including springs having one end of each connected to the shoe and the other end connected to a plug seated in an aperture in the base member, and pressure operated means between the base member and shoe for forcing the shoe against the drum.

2. In a fluid pressure brake, a brake drum, a base member, a shoe carried by the base member and cooperating with the drum, oppositely extending telescoping tubular members between the shoe and base member to normally retract the shoe, pressure operated means between the base member and shoe for forcing the shoe against the drum, said drum and shoe comprising conical members, a lining member on the shoe, and means for releasing said pressure operated means.

3. In a finger touch air brake, a brake drum comprising a plate having a conical portion, a shoe comprising a plate having a conical portion, a lining on the latter conical portion, a support for the shoe, a stationary flange for anchoring the support, opposed interfitting means between the support and shoe for retracting the shoe, cylinders carried by the support having apertured ends, pressure operated pistons carried by the support and having reduced stems operating through the apertures with pressure feet engaging the shoe plate, and a control valve for admitting air pressure to or cutting off air from the said pistons.

4. In an air brake system, brakes including a drum having a frusto-conical peripheral portion with annular flanges, a frusto-conical shoe having a lining conforming to said peripheral portion and coacting therewith, a support for the shoe, oppositely extending interfitting spring actuated means between the shoe and support for retracting the shoe, and pressure operated means between the support and shoe for moving the shoe to braking position.

5. In an air brake system, brakes including a drum having a peripheral portion with annular flanges, a shoe having a lining conforming to said peripheral portion and coacting therewith, a support for the shoe, oppositely extending open ended interfitting cylinders carried by the shoe and support, means within said cylinders between the shoe and support for retracting the shoe, pressure operated means between the support and shoe for moving the shoe to braking position, and an automatic release means for said last mentioned means.

6. In an air brake system, brakes including a drum having a peripheral portion with annular flanges, a shoe having a lining conforming to said peripheral portion and coacting therewith, a support for the shoe, oppositely extending telescoping tubular extensions carried by the shoe and support, spring means within the extensions between the shoe and support for retracting the shoe, pressure operated means between the support and shoe for moving the shoe to braking position, said support comprising a plate held against movement and cooperating with a flange of the brake shoe, and means over said plate and flange to exclude dust and moisture.

7. In an air pressure brake, a conical drum, a plate fitting against the drum at the enlarged open side thereof, a ring of channel cross-section detachably clamped on the peripheral edge of the plate and enveloping the drum to close the joint therebetween, a conical shoe coacting with the drum, telescoping cylinders between the plate and shoe, retractile means therebetween and positioned therein, cylinders formed on the plate, pistons in said cylinders and having stems with contact heads adapted to engage the shoe, said shoe being provided with a clearance between it and a vehicle wheel on which mounted, means for admitting pressure to the cylinders, and means for exhausting the same.

8. In an air pressure brake, a conical drum, a plate fitting against the drum at the enlarged open side thereof, a double flanged split ring enveloping said drum and plate to close the joint therebetween and having its ends connected outwardly thereof, a conical shoe coacting with the drum, telescoping cylinders between the plate and shoe, retractile means therebetween, cylinders formed on the plate, pistons in said cylinders and having stems with enlarged contact heads adapted to engage the shoe, a control valve associated with said brake, said control valve having an operating member, and a control member for actuating the control valve to admit air to or exhaust air from the cylinders.

9. In a fluid pressure operated brake, a brake drum, a base member, a brake shoe slidably supported by said base member, a plurality of cylinders secured to and movable with said base member, a movable piston in each cylinder, means for supplying fluid pressure to said cylinders, pipe connected to said cylinders for connecting said cylinders and interfitting housings carried by the brake shoe and base member with spring means therein to normally retract the shoe.

HAROLD HOLK.